W. V. TURNER.
STOP COCK HANDLE.
APPLICATION FILED MAR. 21, 1907.
1,131,177. Patented Mar. 9, 1915.
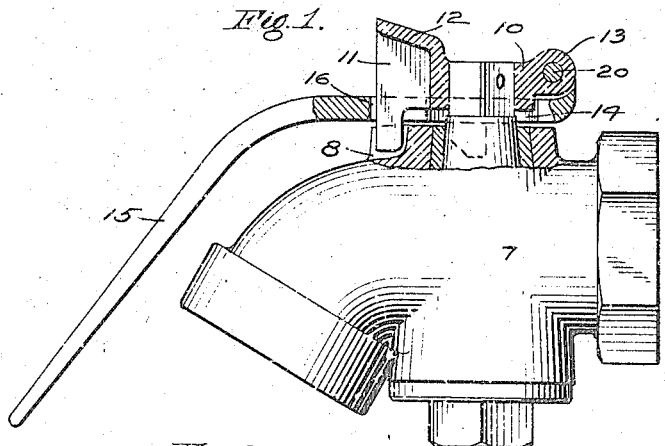
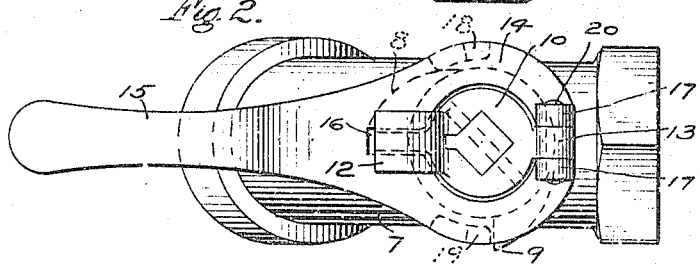
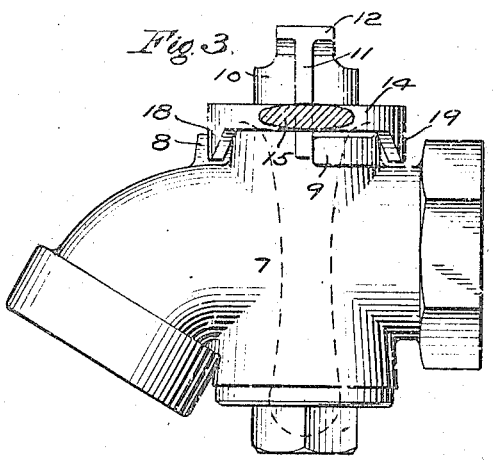
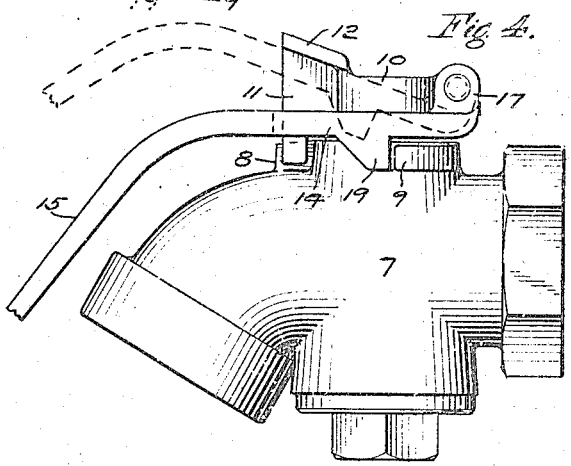
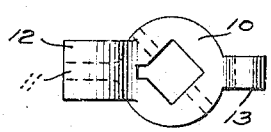
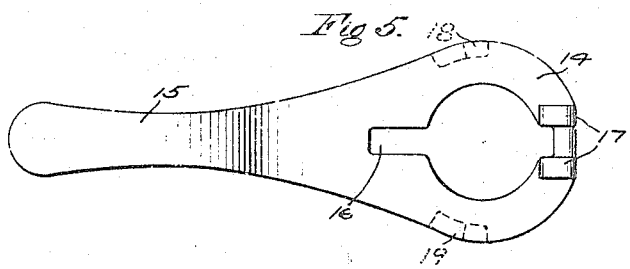
WITNESSES
INVENTOR
Walter V. Turner
by E. Wright
Att'y.

UNITED STATES PATENT OFFICE.

WALTER V. TURNER, OF EDGEWOOD, PENNSYLVANIA, ASSIGNOR TO THE WESTINGHOUSE AIR BRAKE COMPANY, PITTSBURGH, PENNSYLVANIA, A CORPORATION OF PENNSYLVANIA.

STOP-COCK HANDLE.

1,131,177.  Specification of Letters Patent.  Patented Mar. 9, 1915.

Application filed March 21, 1907. Serial No. 363,711.

*To all whom it may concern:*

Be it known that I, WALTER V. TURNER, a citizen of the United States, residing at Edgewood, in the county of Allegheny and State of Pennsylvania, have invented new and useful Improvements in Stop - Cock Handles, of which the following is a specification.

This invention relates to self locking handles for stop cocks, or valves, and is particularly designed for use in connection with stop cocks, or angle cocks, of the train pipe in air brake systems, but is also applicable it any stop cock, or valve, where it is desired to lock the same against accidental movement from one position to another.

This invention is in the nature of an improvement on the device illustrated and covered in prior Re-issue Patent No. 12,574, of Dec. 11, 1906, and has for its principal objects to provide an improved self locking device of this character, which will operate to lock the handle in either of its two positions, open or closed, and to simplify and strengthen the construction and thereby render the same more compact in form, durable in service, and reliable in operation.

In the accompanying drawing; Figure 1 is a side view of an angle cock with my improved handle device applied thereto, the upper part of the cock casing and a portion of the handle mechanism being shown in vertical section; Fig. 2 a plan view of the same; Fig. 3 a side view showing the handle mechanism locked in the closed position of the cock; Fig. 4 a side view showing the handle in the open position of the cock; Fig. 5 a plan view of the handle member; and Fig. 6 a plan view of the bracket member of the device.

As shown in the drawing, the angle cock casing 7 is of the ordinary construction, and the plug cock or key is provided with the usual square upper end portion for receiving the handle.

According to my improvement, the bracket piece 10, which has a square opening for fitting over the upper end of the plug cock, is provided with a laterally extending lug or wing 11, which may also project downward to engage the usual stop lugs 8 and 9 of the cock casing for defining the open and closed positions, respectively, of the cock. The bracket member also has a lug 13, to which the handle may be pivoted, and a flange 12, preferably on the opposite side and over the wing 11, for limiting the upward movement of the handle upon its pivot.

The head portion 14, of the handle member 15, completely surrounds the bracket piece 10, and is provided with lugs 17 for the pivot pin 20, and depending lugs 18 and 19 on opposite sides for engaging the stop lugs 8 and 9 respectively on the cock casing. A slot 16 is also formed through the handle member for the wing 11 of the bracket. By means of this construction, in which the head portion of the handle member is in the form of a continuous ring extending entirely around the bracket piece, a compact, strong, and durable mechanism is produced which prevents any tendency to spread or twist at the pivoted connection. And as the wing 11 extends through the slot 16 of the handle member when the same is raised to its upper position, as indicated in dotted lines in Fig. 4, the handle member bears positively against said wing as the handle is turned from one position to the other.

When the handle mechanism is in the normal open position, as indicated in Figs. 1, 2 and 4, the downwardly projecting portion of the wing 11 bears against the stop lug 8 of the cock casing and the lug 19 of the handle drops in front of the stop lug 9 of the casing, thereby preventing any movement of the handle and the plug cock toward the closed position unless the pivoted handle is raised, as indicated in dotted lines in Fig. 4, so that the lug 19 can pass the stop 9. In order to close the cock, the handle is raised to this position and then turned until the wing 11 strikes the closed stop 9, as shown in Fig. 3. The handle then falls by gravity to its locking position and the lug 18 engages the stop 8, so as to prevent any accidental movement of the handle, or cock, from its closed position.

From the foregoing description, it will now be seen that I have provided a simple and compact construction of self locking handle mechanism which will be strong and durable in rough service, and operate to effectually lock the cock in either its open or its closed position against any accidental movement. According to my invention, it will also be apparent that the locking means is operated by the movement of the handle upon its pivot on the bracket member, said locking means being adapted to engage the fixed stops upon the casing to lock the cock in both its open and in its closed positions, and while a preferred detailed construction is shown and described for this purpose, it is to be understood that my invention is not limited to such specific structure since it is obvious that other particular forms of devices may embody the same essential characteristics.

Having now described my invention, what I claim as new, and desire to secure by Letters Patent, is:—

1. A stop cock device, comprising a plug cock or valve, a casing having a stop, a bracket member secured to the cock-key and having a projecting wing portion, a handle member pivoted to and surrounding said bracket and having a slot or opening for receiving said wing in the raised position of the handle, and means carried by said handle for engaging said stop and locking the cock against accidental movement.

2. A stop cock device, comprising a plug cock or valve, a casing having stops to limit the movement of the cock, a bracket member secured to the cock-key, a handle member pivoted to said bracket and having a slot or opening, said bracket being provided with a wing portion adapted to enter into said slot or opening and a flange for engaging said handle when in its raised position, and means carried by said handle for engaging one of said stops and locking the cock against accidental movement.

3. A stop cock device, comprising a plug cock or valve, a casing therefor having fixed stops to limit the movement of the cock and define its open and closed positions, a bracket member secured to the plug cock, a handle member pivoted on said bracket, and locking means operated by the movement of the handle upon its pivot for engaging said stops in the open and in the closed positions to prevent accidental movement of the cock.

4. A stop cock device, comprising a plug cock or valve, a casing having stops to limit the movement of the cock, a bracket member secured to the plug cock, and a handle member pivoted to said bracket, and having means for engaging said stops in the open and in the closed positions to lock the cock against accidental movement.

In testimony whereof I have hereunto set my hand.

WALTER V. TURNER.

Witnesses:
R. F. EMERY,
J. B. MACDONALD.